(12) United States Patent
Hsieh

(10) Patent No.: US 9,713,176 B2
(45) Date of Patent: Jul. 18, 2017

(54) TELECOMMUNICATION METHOD AND TELECOMMUNICATION SYSTEM

(71) Applicant: Wistron Corporation, New Taipei (TW)

(72) Inventor: Cheng-Ying Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 311 days.

(21) Appl. No.: 14/179,534

(22) Filed: Feb. 12, 2014

(65) Prior Publication Data

US 2014/0323088 A1    Oct. 30, 2014

(30) Foreign Application Priority Data

Apr. 26, 2013    (TW) .............................. 102115094 A

(51) Int. Cl.
*H04M 1/66* (2006.01)
*H04B 7/00* (2006.01)
(Continued)

(52) U.S. Cl.
CPC ........... *H04W 76/02* (2013.01); *H04W 12/08* (2013.01)

(58) Field of Classification Search
CPC ....... H04W 88/18; H04W 8/08; H04W 36/08; H04W 8/02; H04W 8/26; H04W 12/08; H04W 36/0055; H04W 36/14; H04W 48/18; H04W 60/04; H04W 76/02; H04W 76/022; H04W 76/062; H04W 84/045; H04W 8/16; H04W 92/12

USPC ...... 455/404.1, 404.2, 41.2, 411, 435.1, 436, 455/433, 525, 406, 432.1; 370/352, 329, 370/331, 315, 328; 726/5

See application file for complete search history.

(56) References Cited

U.S. PATENT DOCUMENTS

2005/0122941 A1* 6/2005 Wu ..................... H04L 63/0853
                                                                370/338
2006/0123470 A1* 6/2006 Chen ....................... H04L 63/08
                                                                726/5

(Continued)

FOREIGN PATENT DOCUMENTS

CN          1949924       4/2010
CN          102761981     10/2012

(Continued)

OTHER PUBLICATIONS

"Office Action of Taiwan Counterpart Application", issued on Jan. 12, 2015, with English translation thereof, p. 1-p. 9.

*Primary Examiner* — Kiet Doan
(74) *Attorney, Agent, or Firm* — Jianq Chyun IP Office

(57) ABSTRACT

A telecommunication method for a user equipment roaming to a visited network is provided. A local network provides a telecommunication service to a user corresponding to the user equipment. In the telecommunication method, a service is started on the user equipment. According to the started service, the user equipment transmits an access point name query to the visited network. According to the access point name query, the visited network performs an authority check procedure with the local network on the user. When the user passes the authority check procedure, the visited network delivers an access point name corresponding to the service to the user equipment and the user equipment starts the service through the access point name.

14 Claims, 4 Drawing Sheets

(51) Int. Cl.
*H04W 76/02* (2009.01)
*H04W 12/08* (2009.01)

(56) References Cited

U.S. PATENT DOCUMENTS

| | | | | |
|---|---|---|---|---|
| 2007/0297367 A1* | 12/2007 | Wang | ............... | H04L 63/0414 370/331 |
| 2009/0047947 A1* | 2/2009 | Giaretta | ............... | H04W 48/17 455/432.1 |
| 2013/0102356 A1* | 4/2013 | Shaw | ............... | H04W 48/20 455/525 |

FOREIGN PATENT DOCUMENTS

| | | |
|---|---|---|
| CN | 102917332 | 2/2013 |
| EP | 1623595 | 6/2010 |

* cited by examiner

TELECOMMUNICATION METHOD AND TELECOMMUNICATION SYSTEM

CROSS-REFERENCE TO RELATED APPLICATION

This application claims the priority benefit of Taiwan application serial no. 102115094, filed on Apr. 26, 2013. The entirety of the above-mentioned patent application is hereby incorporated by reference herein and made a part of this specification.

BACKGROUND OF THE DISCLOSURE

Field of Disclosure

The present disclosure relates to a telecommunication method and a telecommunication system. More particularly, the present disclosure relates to a telecommunication method for a user equipment roaming to a visited network and a telecommunication system for controlling the visited network.

Description of Related Art

When the mobile equipment (i.e. the user equipment) roams to different visited networks outside the local network, different visited networks can allocate different internet protocol addresses to the mobile equipment. Further, other ways to communicate with the mobile equipment may be still based on the communication between the local address and the mobile equipment. That is, the mobile equipment utilizes the access point name built in the subscriber identity module (SIM) as the communication interface between the mobile equipment and the gateway GPRS support node (GGSN) of the local network. Hence, even if the mobile equipment roams to the visited network, the data transmission and telecommunication service of the mobile equipment are still routed through the local network.

However, the delay phenomenon of the signal transmission happens between the mobile equipment and other parties due to that all of the communications (such as data receiving and data transmission) are handled by the local network. When the mobile equipment roams to a visited network the routing distance between which and the local network is larger, the delay phenomenon becomes worse. Furthermore, the signal delay varies depending on different routs from the visited network to the local network. Therefore, the real-time application (such as the voice-over-IP (VoIP)) of the conventional telecommunication technology such as the mobile internet protocol (MIP) turns out to be not as well as expected.

SUMMARY OF THE DISCLOSURE

Accordingly, at least one objective of the present disclosure is to provide a telecommunication method and a telecommunication system, in which the user equipment in roaming status is capable of obtaining access point name from the visited network to use the corresponding service.

The present disclosure provides a telecommunication method for a user equipment roaming to a visited network. The local network provides a telecommunication service to a user corresponding to the user equipment. In the telecommunication method, a service is started on the user equipment. According to the started service, the user equipment transmits an access point name query to the visited network. According to the access point name query, the visited network performs an authority check procedure with the local network on the user. When the user passes the authority check procedure, the visited network provides an access point name corresponding to the service to the user equipment. The user equipment starts the service through the access point name.

According to one embodiment of the present disclosure, the visited network includes a base station subsystem and a access point name management entity, and the step of transmitting the access point name query to the visited network by the user equipment comprises: transmitting a radio resource control connection request to the visited network by the user equipment according to the started service and transmitting a non-access stratum message to the access point name management entity by the base station subsystem according to the radio resource control connection request.

According to one embodiment of the present disclosure, the authority check procedure comprises: transmitting an authorization request with respect to the user to the local network by access point name management entity, and transmitting an authorization response to the access point name management entity by the local network for responding whether the user passes the authority check procedure according to the authorization request.

According to one embodiment of the present disclosure, the step of providing an access point name corresponding to the service to the user equipment by the visited network comprises: transmitting the non-access stratum message containing the access point name to the base station subsystem by the access point name management entity when the authorization response reveals that the user passes the authority check procedure, and transmitting a radio resource control completed message to the user equipment by the base station subsystem, wherein the radio resource control completed message includes the access point name.

According to one embodiment of the present disclosure, before the step of starting the service on the user equipment, the telecommunication method further comprises steps of allocating a radio resource to the user equipment by the visited network, transmitting an attach request to the visited network by the user equipment, performing a preliminary identity check on the user with the local network by the visited network, and transmitting an attach accept message to the user equipment and providing the user equipment an internet protocol address by the visited network when the user passes the preliminary identity check.

According to one embodiment of the present disclosure, at the time the step of performing the preliminary identity check, the telecommunication method further comprises executing an encryption process by the visited network to encrypt a data transmitted between the visited network and the local network.

According to one embodiment of the present disclosure, the step of allocating the radio resource to the user equipment by the visited network comprises: transmitting a radio resource control request to the visited network by the user equipment and establishing a radio resource control connection between the user equipment and the visited network according to the radio resource control request and allocating the radio resource to the user equipment by the visited network.

The present disclosure further provides a telecommunication system for controlling a first network. The telecommunication system comprises a base station subsystem, a switch subsystem and an access point name management entity. The base station subsystem is used for receiving an access point name query issued by an user equipment starting a service thereon and roaming to a first network, wherein the local network provides a telecommunication service to a user corresponding to the user equipment. According to the access point name query, the access point name management entity performs an authority check procedure on the user with the local network through the switch subsystem, and provides an access point name corresponding to the service to the user equipment through the base station subsystem when the user passes the authority check procedure.

According to one embodiment of the present disclosure, the base station subsystem receiving the access point name query further comprises: the base station subsystem receives a radio resource control connection request transmitted from the user equipment and transmits a non-access stratum message to the access point name management entity according to the radio resource control connection request.

According to one embodiment of the present disclosure, in the authority check procedure, the access point name management entity further transmits an authorization request with respect to the user to the local network through the switch subsystem and receives an authorization response transmitted from the local network, wherein the authorization response is used to respond whether the user passes the authority check procedure.

According to one embodiment of the present disclosure, the access point name management entity providing the access point name corresponding to the service to the user equipment further transmits a non-access stratum message containing the access point name to the base station subsystem when the authorization response reveals that the user passes the authority check procedure and the base station subsystem transmits a radio resource control completed message to the user equipment, wherein the radio resource control completed message includes the access point name.

According to one embodiment of the present disclosure, the base station subsystem further allocates a radio resource to the user equipment, the switch subsystem receives an attach request from the user equipment through the base station subsystem and the base station subsystem performs a preliminary identity check on the user with the local network and when the user passes the preliminary identity check, the switch subsystem transmits an attach accept message to the user equipment through the base station subsystem and the base station subsystem provides the user equipment an internet protocol address.

According to one embodiment of the present disclosure, at the time the switch subsystem transmits the attach accept message; the switch subsystem further executes an encryption process to encrypt a data transmitted between the first network and the local network.

According to one embodiment of the present disclosure, the base station subsystem allocating the radio resource to the user equipment further: receives a radio resource control request transmitted from the user equipment, establishes a radio resource control connection between the base station subsystem and the user equipment according to the radio resource control request and allocates the radio resource to the user equipment.

Accordingly, in the present disclosure, the user equipment directly sends the access point name request to the visited network, the visited network performs the user identity check/the authority check procedure with the local network corresponding to the user equipment on the user corresponding to the user equipment, and the visited network around with the user equipment roams provides the access point name corresponding to the required service/the service to be started to the user equipment when the user passes the user identity check/the authority check procedure. Thus, the user equipment uses the service directly through the corresponding access point name provided by the visited network. That is, while the user equipment in roaming status uses a service, it is not necessary for the user equipment connecting to the local network through the visited network and using the service provided by the local network as the way used in the conventional roaming technology. Hence, the cost of the telecommunication can be decreased and the consumption of the radio resources can be decreased as well.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE PREFERRED EMBODIMENTS

Figure 1:
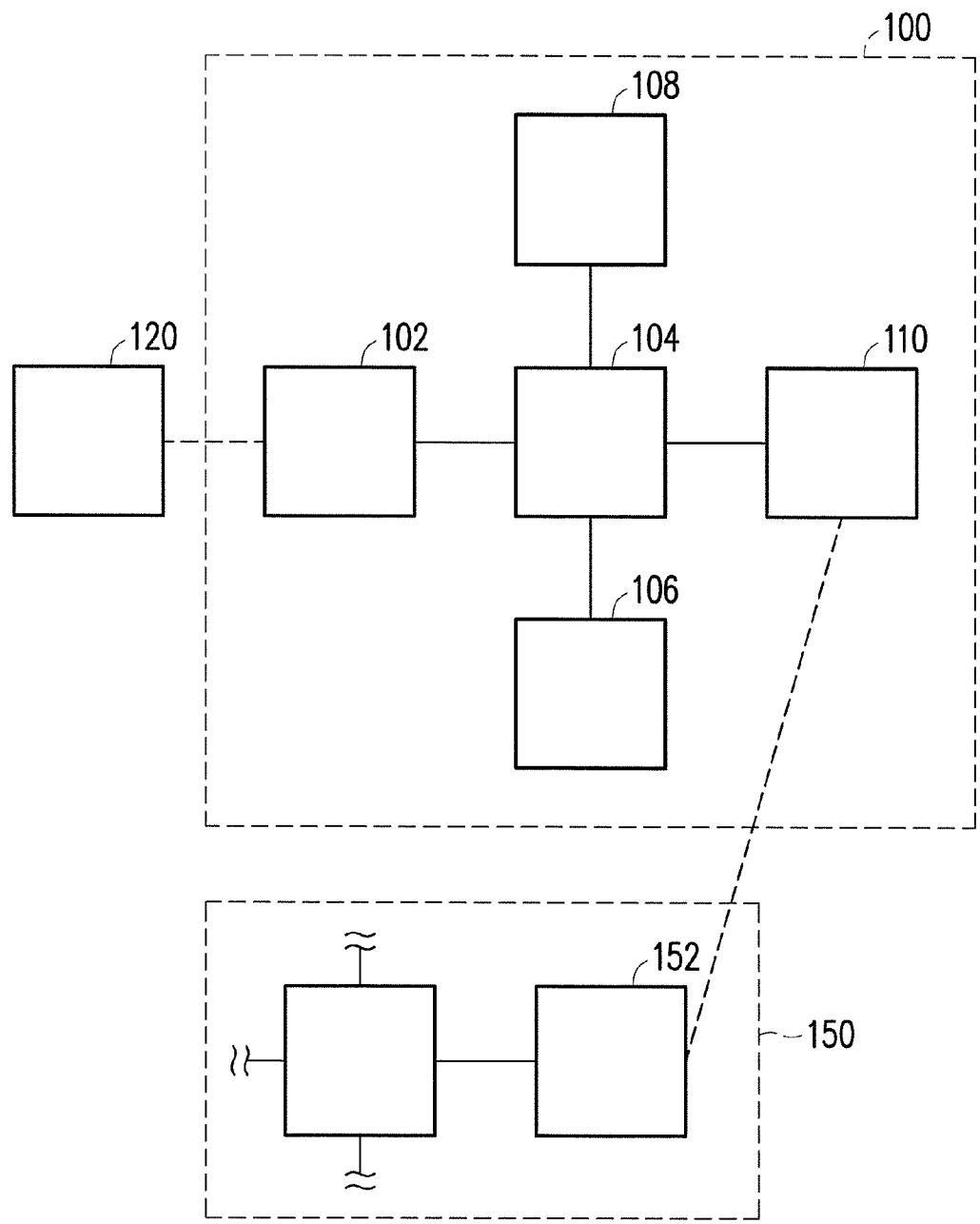
FIG. 1 is a schematic diagram showing a telecommunication system according to one embodiment of the present disclosure.

FIG. 1 is a schematic diagram showing a telecommunication system according to one embodiment of the present disclosure. As shown in FIG. 1, a telecommunication system 100 of the present embodiment comprises a base station subsystem (BSS) 102, a switch subsystem (SSS) 104, an access point name management entity (APN management entity) 106, a home location register (HLR) 108 and a Gateway GPRS Support Node (GGSN) 110. The base station subsystem 102 can be, for example, a base station (BS), a base station controller (BSC), a Node B, a radio network controller (RNC) or a evolved Node B (eNode B). The switch subsystem 104 is used to perform mobility control for tracking the positions of the users so that the users can make phone calls, transmit short messages or execute other mobile communication services, and the switch subsystem 104 can be, for example, a serving-GPRS support node (SGSN) or a mobility management entity (MME).

Moreover, the access point name management entity 106 can be, for example, a domain name server (DNS). Further, the HLR 108 is used for performing the user identity check. The GGSN 110 is used as the gateway interface for connecting the telecommunication system 100 to other various digital networks. In the present embodiment, for instance, a user equipment 120 roams to a visited network controlled by the telecommunication system 100 and when the user equipment 120 needs to use the telecommunication service, it is necessary for the user equipment 120 to connect a GGSN 152 of a local network 150, from which the user corresponding to the user equipment 120 registers/purchases telecommunication service, through the GGSN 110 of the visited network so that the necessary operation (such as user identity check, service authorization of the user or payment distribution between the telecommunication systems) can be performed while the user equipment roams and uses the telecommunication service at the same time.

Figure 2:
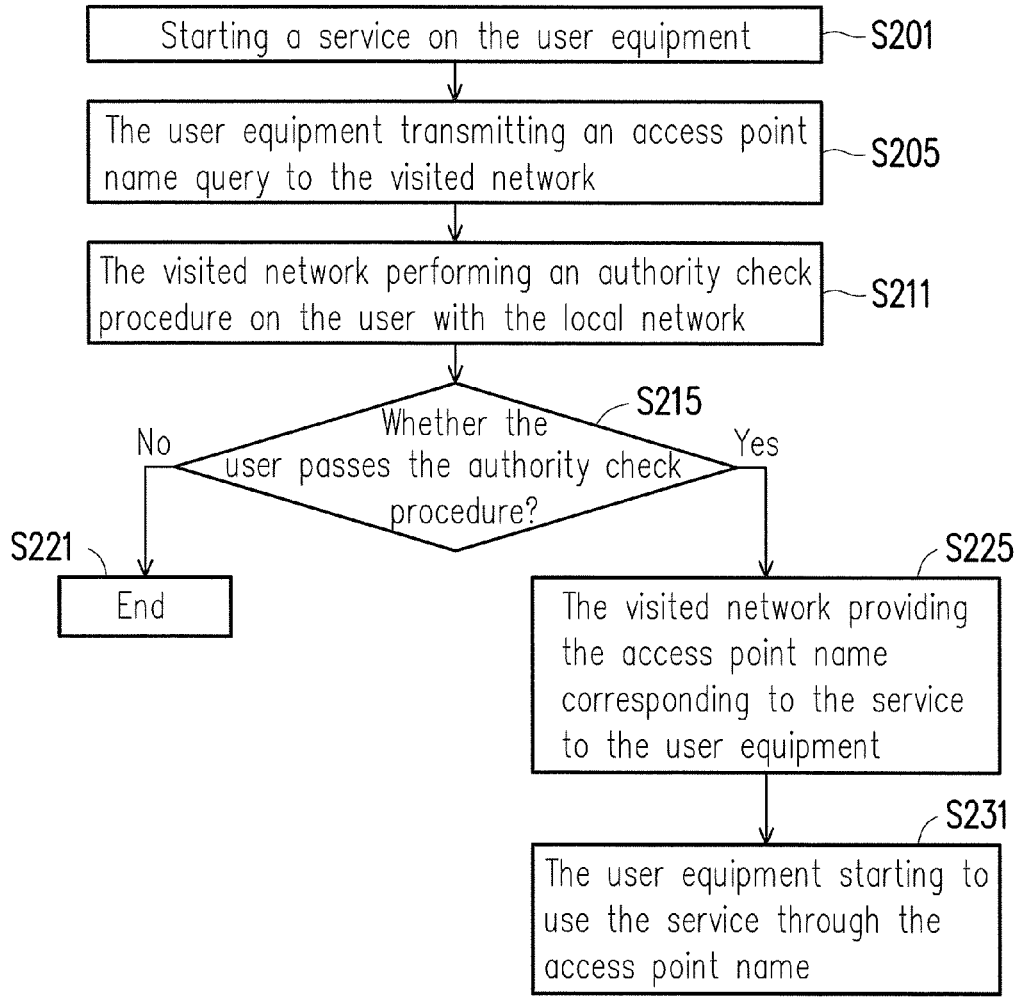
FIG. 2 is a schematic flow chart illustrating a telecommunication method according to one embodiment of the present disclosure.

FIG. 2 is a schematic flow chart illustrating a telecommunication method according to one embodiment of the present disclosure. As shown in FIG. 1 and FIG. 2, when the user equipment 102 roams to a visited network controlled by the telecommunication system 100, in the step S201, the user starts a service (such as making a phone call, opening a website or transmitting a short message) on the user equipment 120. In the step S205, according to the service launched on the user equipment 120 and started by the user, the user equipment transmits an access point name query (APN query) to the base station subsystem 102 of the visited network. Thereafter, in the step S211, according to the APN query, the APN management entity 106 of the visited network performs an authority check procedure on the user corresponding to the user equipment 120 with the local network 150 through the switch subsystem 104 and the GGSN 110. That is, the visited network verifies with the local network 150 whether the user who issues the service request has the authority for using the service. In another embodiment, the authority check procedure performed by the visited network also comprises steps of performing the user identity check and notifying the local network that the user who roams to the visited network is about to start to use the function of a specific service.

In the step S215, it is determined whether the user passes the authority check procedure. In the step S221, when the user does not pass the authority check procedure (which means the user does not have the authority to use this service), the APN query is terminated. In other words, the visited network does not provide any access point name to the user equipment 120. Alternatively, in the step S225, when the user passes the authority check procedure, the APN management entity 106 of the visited network provides the access point name corresponding to the service to the user equipment 120 through the switch subsystem 104 and the base station subsystem 102. Then, in the step S231, the user equipment 120 starts to use the service through the access point name.

Figure 3:
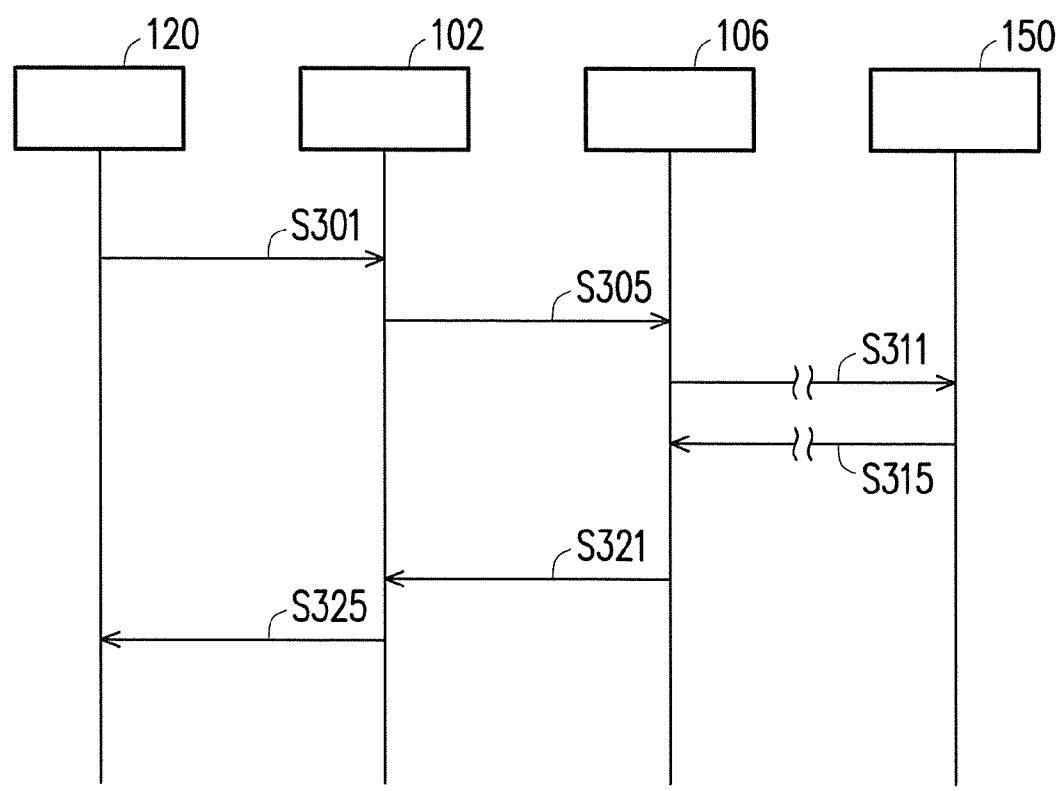
FIG. 3 is a flow chart illustrating steps of transmitting an access point name query to a visited network by a user equipment and obtaining an access point name from the visited network by the user equipment according to one embodiment of the present disclosure.

FIG. 3 is a flow chart illustrating steps of transmitting an access point name query to a visited network by a user equipment and obtaining an access point name from the visited network by the user equipment according to one embodiment of the present disclosure. As shown in FIG. 1 and FIG. 3, the steps S205 through S225 in the aforementioned embodiment, in which the user equipment transmits the APN query to the visited network and obtains the access point name provided by the visited network, further comprises step S301 of transmitting radio resource control connection request (RRC connection request) to the base station subsystem 102 of the visited network according to the started service. The RRC connection request includes the information element (IE) of the APN query of the service type of the service to be started. In the step S305, according to the RRC connection request, the base station subsystem 102 transmits a non-access stratum message (NAS message) to the APN management entity 106.

In the steps S311 through S315, the authority check procedure described in the aforementioned step S211 is performed. More specifically, in the step S311, the APN management entity 106 transmits an authorization request with respect to the user corresponding to the user equipment 120 to the local network 150 (such as the home subscriber server (HSS) of the local network 150) through the switch subsystem 104 and the GGSN 110. In the step S315, according to the authorization request, the local network 150 transmits an authorization response to the APN management entity 106 through the switch subsystem 104 for responding whether the user passes the authority check procedure.

In the steps S321 through S325, the step S225 mentioned in the previous embodiment, in which the visited network provides the access point name to the user equipment, are further described. More specifically, when the authorization request reveals that the user passes the authority check procedure, in the step S321, the APN management entity 106 transmits the NAS message including the access point name to the base station subsystem 102. Then, in the step S325, the base station subsystem 102 transmits a radio resource control completed message (RRC completed message) to the user equipment 120. The RRC completed message contains the access point name provided by the APN management entity 106.

Figure 4:
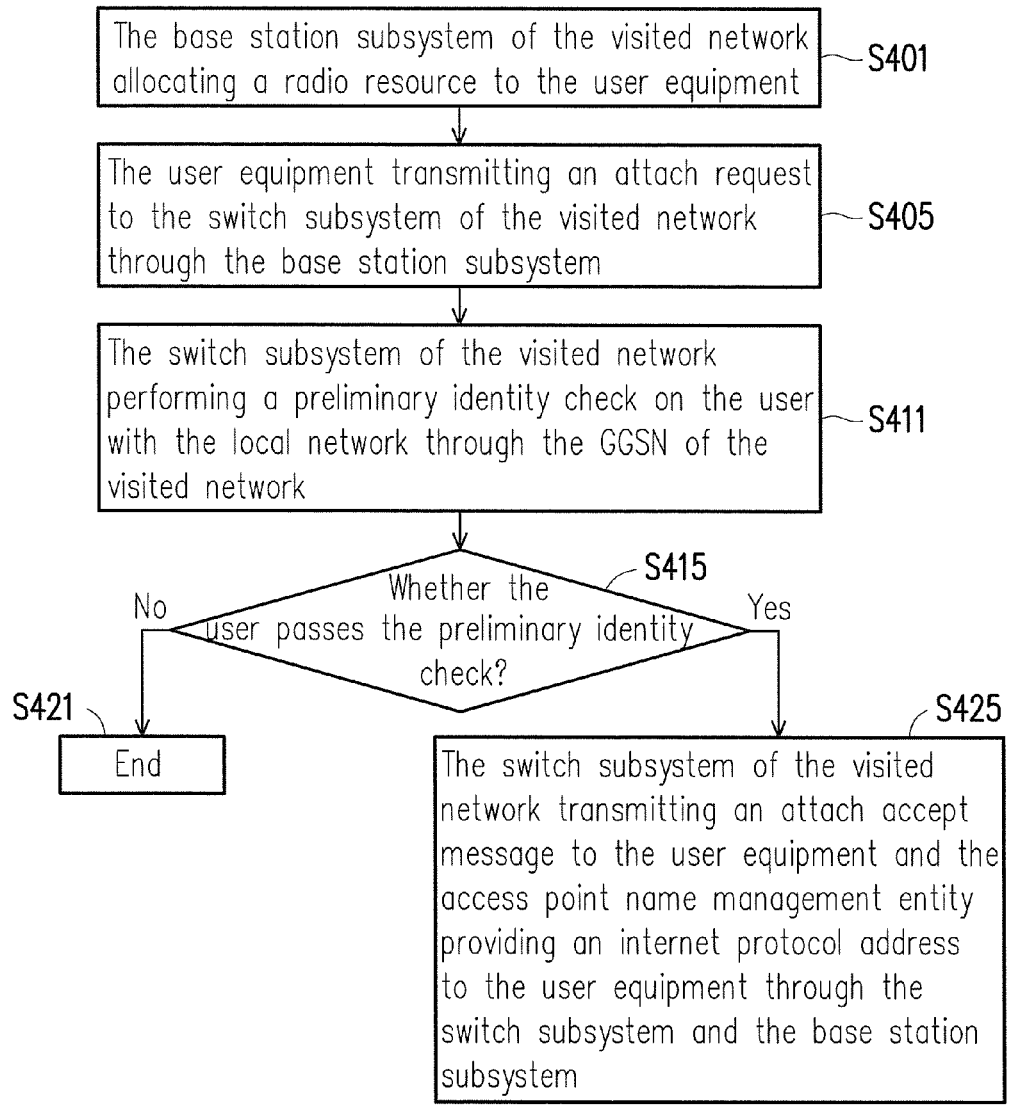
FIG. 4 is a flow chart illustrating a method for connecting the user equipment to the switch subsystem of the visited network according to one embodiment of the present disclosure.

FIG. 4 is a flow chart illustrating a method for connecting the user equipment to the switch subsystem of the visited network according to one embodiment of the present disclosure. As shown in FIG. 1 and FIG. 4, before the user starts the service on the user equipment 120 (e.g. the user equipment 120 is turned on in the visited network), the base station subsystem 102 of the visited network allocates a radio resource to the user equipment 120, in step S401. Thereafter, in the step S405, the user equipment 120 transmits an attach request to the switch subsystem 104 of the visited network through the base station subsystem 102. In the step S411, the switch subsystem 104 of the visited network performs a preliminary identity check on the user with the local network 150 through the GGSN 110 of the visited network. The preliminary identity check further comprises step of checking the services which can be used by the user with the local network 150. Then, in the step S415, whether the user passes the preliminary identity check is determined. In the step S421, when the user does not passes the preliminary identity check, the connection between the user equipment 120 and the switch subsystem of the visited network is cut off.

When the user passes the preliminary identity check, in the step S425, the switch subsystem 104 of the visited network transmits an attach accept message to the user equipment 120 and the APN management entity 106 provides an internet protocol address (IP address) to the user equipment 120 through the switch subsystem 104 and the base station subsystem 102. Moreover, in the step S411, at the time the preliminary identity check is performed, the switch subsystem 104 of the visited network executes an encryption process to encrypt a data transmitted between the visited network and the local network 150.

Figure 5:
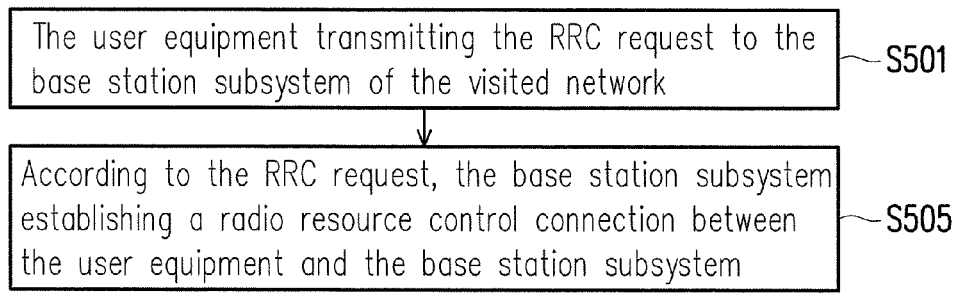
FIG. 5 is a flow chart illustrating a method for the base station subsystem allocating radio resource to the user equipment according to one embodiment of the present disclosure.

Furthermore, in the previous embodiment, the step S401 of allocating the radio resource to the user equipment 120 by the base station subsystem 102 of the visited network includes the step S501 (as shown in FIG. 5) of transmitting the RRC request to the base station subsystem 102 by the user equipment 120. Then, in the step S505 (as shown in FIG. 5), according to the RRC request, the base station subsystem 102 establishes a radio resource control connection between the user equipment 120 and the base station subsystem 102 and the base station subsystem 102 of the visited network allocates the radio resource to the user equipment 120.

Altogether, in the present disclosure, the user equipment directly sends the access point name request to the visited network, the visited network performs the user identity check/the authority check procedure with the local network corresponding to the user equipment on the user corresponding to the user equipment, and the visited network around with the user equipment roams provides the access point name corresponding to the required service/the service to be started to the user equipment when the user passes the user identity check/the authority check procedure. Thus, the user equipment uses the service directly through the corresponding access point name provided by the visited network. That is, while the user equipment in roaming status uses a service, it is not necessary for the user equipment connecting to the local network through the visited network and using the service provided by the local network as the way used in the conventional roaming technology. Hence, the cost of the telecommunication can be decreased and the consumption of the radio resources can be decreased as well.

It will be apparent to those skilled in the art that various modifications and variations can be made to the structure of the present disclosure without departing from the scope or spirit of the disclosure. In view of the foregoing descriptions, it is intended that the present disclosure covers modifications and variations of this disclosure if they fall within the scope of the following claims and their equivalents.

What is claimed is:

1. A telecommunication method for a user equipment roaming to a visited network, wherein the local network provides a telecommunication service to a user corresponding to the user equipment, the method comprising:
    starting a service, by the user equipment, on the user equipment by transmitting an access point name query to the visited network to obtain a new access point name from the visited network;
    performing, by the visited network, an authority check procedure with the local network on the user according to the access point name query after the visited network receiving the access point name query;
    providing, by the visited network itself, the new access point name corresponding to the visited network to the user equipment when the user passes the authority check procedure; and
    starting, by the user equipment, the service through the new access point name corresponding to the visited network without routing back or connecting to the local network.

2. The telecommunication method of claim 1, wherein the visited network includes a base station subsystem and a access point name management entity, and the step of transmitting the access point name query to the visited network by the user equipment comprises:
    transmitting a radio resource control connection request to the visited network by the user equipment according to the started service; and
    transmitting a non-access stratum message to the access point name management entity by the base station subsystem according to the radio resource control connection request.

3. The telecommunication method of claim 2, wherein the authority check procedure comprises:
    transmitting an authorization request with respect to the user to the local network by access point name management entity; and
    transmitting an authorization response to the access point name management entity by the local network for responding whether the user passes the authority check procedure according to the authorization request.

4. The telecommunication method of claim 3, wherein the step of providing, by the visited network itself, the new access point name corresponding to the visited network to the user equipment when the user passes the authority check procedure comprises:
    transmitting the non-access stratum message containing the new access point name corresponding to the visited network to the base station subsystem by the access point name management entity when the authorization response reveals that the user passes the authority check procedure; and
    transmitting a radio resource control completed message to the user equipment by the base station subsystem, wherein the radio resource control completed message includes the access point name corresponding to the visited network.

5. The telecommunication method of claim 1, before the step of starting, by the user equipment, the service on the user equipment, further comprising:
    allocating a radio resource to the user equipment by the visited network;
    transmitting an attach request to the visited network by the user equipment;
    performing a preliminary identity check on the user with the local network by the visited network; and
    transmitting an attach accept message to the user equipment and providing the user equipment an internet protocol address by the visited network when the user passes the preliminary identity check.

6. The telecommunication method of claim 5, at the time the step of performing the preliminary identity check, further comprising:
    executing an encryption process by the visited network to encrypt a data transmitted between the visited network and the local network.

7. The telecommunication method of claim 5, wherein the step of allocating the radio resource to the user equipment by the visited network comprises:
    transmitting a radio resource control request to the visited network by the user equipment; and
    establishing a radio resource control connection between the user equipment and the visited network according to the radio resource control request and allocating the radio resource to the user equipment by the visited network.

8. A telecommunication system, controlling a visited network, the system comprising:
    a base station subsystem, receiving an access point name query issued by a user equipment starting a service thereon and roaming to the visited network, wherein the local network provides a telecommunication service to a user corresponding to the user equipment, wherein the access point name query requests a new access point name corresponding to the visited network from the visited network, and the new access point name corresponding to the visited network is not provided by the local network and the user equipment;
    a switch subsystem; and
    an access point name management entity, performing an authority check procedure on the user with the local network through the switch subsystem according to the access point name query, and itself providing the new access point name corresponding to the visited network to the user equipment through the base station subsystem when the user passes the authority check procedure, wherein the user equipment, after receiving the provided new access point name corresponding to the visited network, starts the service through the provided new access point name without routing back or connecting to the local network.

9. The telecommunication system of claim 8, wherein the base station subsystem receiving the access point name query further comprises: the base station subsystem receives a radio resource control connection request transmitted from the user equipment and transmits a non-access stratum message to the access point name management entity according to the radio resource control connection request.

10. The telecommunication system of claim 8, wherein, in the authority check procedure, the access point name management entity further transmits an authorization request with respect to the user to the local network through the switch subsystem and receives an authorization response transmitted from the local network, wherein the authorization response is used to respond whether the user passes the authority check procedure.

11. The telecommunication system of claim 10, wherein the access point name management entity providing the new access point name corresponding to the visited network to the user equipment further transmits a non-access stratum message containing the new access point name corresponding to the visited network to the base station subsystem when the authorization response reveals that the user passes the authority check procedure and the base station subsystem transmits a radio resource control completed message to the user equipment, wherein the radio resource control completed message includes the access point name.

12. The telecommunication system of claim 8, wherein the base station subsystem further allocates a radio resource to the user equipment, the switch subsystem receives an attach request from the user equipment through the base station subsystem and the base station subsystem performs a preliminary identity check on the user with the local network and when the user passes the preliminary identity check, the switch subsystem transmits an attach accept message to the user equipment through the base station subsystem and the base station subsystem provides the user equipment an internet protocol address.

13. The telecommunication system of claim 12, wherein at the time the switch subsystem transmits the attach accept message, the switch subsystem further executes an encryption process to encrypt a data transmitted between the visited network and the local network.

14. The telecommunication system of claim 12, wherein the base station subsystem allocating the radio resource to the user equipment further
receives a radio resource control request transmitted from the user equipment, establishes a radio resource control connection between the base station subsystem and the user equipment according to the radio resource control request and allocates the radio resource to the user equipment.

* * * * *